United States Patent
Guenkova-Luy et al.

(10) Patent No.: US 11,190,903 B2
(45) Date of Patent: Nov. 30, 2021

(54) TELEMATICS SYSTEM AND METHOD FOR OPERATING A TELEMATICS SYSTEM

(71) Applicant: Harman Becker Automotive Systems GmbH, Karlsbad (DE)

(72) Inventors: Teodora Guenkova-Luy, Ulm-Grimmelfingen (DE); Martin Clauss, Ummendorf (DE); Andreas Klimke, Ulm-Söflingen (DE); Oliver Abt, Blaustein (DE)

(73) Assignee: Harman Becker Automotive Systems GmbH, Karlsbad-Ittersbach (DE)

( * ) Notice: Subject to any disclaimer, the term of this patent is extended or adjusted under 35 U.S.C. 154(b) by 340 days.

(21) Appl. No.: 16/468,078

(22) PCT Filed: Dec. 16, 2016

(86) PCT No.: PCT/EP2016/081480
§ 371 (c)(1),
(2) Date: Jun. 10, 2019

(87) PCT Pub. No.: WO2018/108289
PCT Pub. Date: Jun. 21, 2018

(65) Prior Publication Data
US 2020/0077228 A1      Mar. 5, 2020

(51) Int. Cl.
| | |
|---|---|
| *H04W 4/02* | (2018.01) |
| *H04W 4/021* | (2018.01) |
| *H04W 4/44* | (2018.01) |
| *G07C 5/00* | (2006.01) |
| *H04L 29/08* | (2006.01) |
| *H04W 64/00* | (2009.01) |

(52) U.S. Cl.
CPC ............ *H04W 4/022* (2013.01); *G07C 5/008* (2013.01); *H04L 67/12* (2013.01); *H04W 4/44* (2018.02); *H04W 64/006* (2013.01)

(58) Field of Classification Search
CPC .......... H04W 4/022–44; H04W 64/006; H04L 67/12; G07C 5/008
See application file for complete search history.

(56) References Cited

U.S. PATENT DOCUMENTS

| | | | |
|---|---|---|---|
| 9,473,890 B1 | 10/2016 | Liu et al. | |
| 9,830,665 B1 * | 11/2017 | Healy | ...................... G07C 5/02 |

(Continued)

FOREIGN PATENT DOCUMENTS

| | | |
|---|---|---|
| CN | 1692658 A | 11/2005 |
| CN | 1843051 A | 10/2006 |
| WO | 2009067766 A1 | 6/2009 |

*Primary Examiner* — Calvin Cheung
(74) *Attorney, Agent, or Firm* — Angela M. Brunetti

(57) ABSTRACT

A method for operating a telematics system that determines the current geographic position of a user device with respect to a static boundary separating a first zone and a second zone, determines at least one first parameter, determines a dynamic boundary separating the first zone and the second zone, based on the course of the static boundary, the current geographic position and the at least one first parameter, determines whether the current position of the user device is located in the first zone or the second zone based on the course of the dynamic boundary, and activates or deactivates one or more telematics services depending on the zone the user device is located in.

13 Claims, 4 Drawing Sheets

(56) References Cited

U.S. PATENT DOCUMENTS

| | | |
|---|---|---|
| 2007/0202908 A1 | 8/2007 | Shaffer |
| 2012/0306660 A1 | 12/2012 | Stopel et al. |
| 2013/0297175 A1* | 11/2013 | Davidson ............... G08G 1/202 |
| | | 701/99 |
| 2016/0042733 A1 | 2/2016 | Yuan et al. |
| 2016/0125519 A1 | 5/2016 | Sundaresan |
| 2016/0210800 A1 | 7/2016 | Bostick |

* cited by examiner

TELEMATICS SYSTEM AND METHOD FOR OPERATING A TELEMATICS SYSTEM

TECHNICAL FIELD

The disclosure relates to a telematics system and a method for operating a telematics system, in particular for controlling the activation of services in a telematics system.

BACKGROUND

More and more vehicles are equipped with telematics systems that can provide many different services to the user. Some of these services in telematics systems may be activated or deactivated based on the location of the vehicle. For example, language settings may be adapted or a different mobile provider may be chosen if a country's border is crossed, or a weather forecast may be provided for the region the vehicle is currently travelling through. Another example of a telematics service is the automatic collision notification where, in case of an accident, a first emergency service may be informed if the vehicle is in a first region and a second emergency service may be informed if the vehicle is in a second region.

SUMMARY

A method is provided for operating a telematics system. The method includes determining the current geographic position of a user device with respect to a static boundary separating a first zone and a second zone, determining at least one first parameter, the at least one first parameter comprising at least one of a user specific parameter, a user device specific parameter, and a network parameter of a network the user device is connected to, determining a dynamic boundary separating the first zone and the second zone, based on the course of the static boundary, the current geographic position and the at least one first parameter, determining whether the current position of the user device is located in the first zone or the second zone based on the course of the dynamic boundary, and activating or deactivating one or more telematics services depending on the zone the user device is located in.

A telematics system is provided. The telematics system includes a user device that is configured to determine its current geographic position with respect to a static boundary separating a first zone and a second zone, determine at least one first parameter, the at least one first parameter comprising at least one of a user specific parameter, a user device specific parameter, and a network parameter of a network the user device is connected to, determine a dynamic boundary separating the first zone and the second zone, based on the course of the static boundary, the current geographic position and the at least one first parameter, determine whether the current position of the user device is located in the first zone or the second zone based on the course of the dynamic boundary, and activate or deactivate one or more telematics services depending on the zone the user device is located in.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The method may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
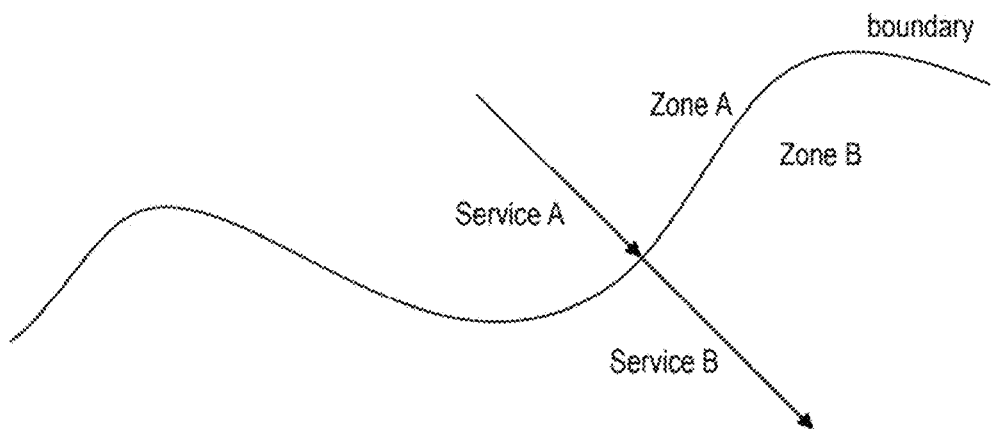
FIG. 1 schematically illustrates a boundary separating a first zone from a second zone.

FIG. 1 schematically illustrates a static boundary separating a first zone A from a second zone B. The static boundary may represent a national border between a first country (zone A) and a second country (zone B). This is however only an example. The static boundary may be defined by any other suitable geographic or non-geographic criteria. For example, the first zone A may be a zone in which a first service A is available, whereas a second service B is available in the second zone B. The first service A and second service B may be a first mobile network and a second mobile network or a first telematics service and a second telematics service, for example. While a user device is located within the first zone A, the first service is available. When the user device crosses the boundary between the zones A, B, the first service A may no longer be available. The second service B, however, may be available while the user device is located within the second zone B. This means, that the first service A may be deactivated and the second service B may be activated when it is detected that the user device crosses the boundary front the first zone A into the second zone B.

Figure 2:
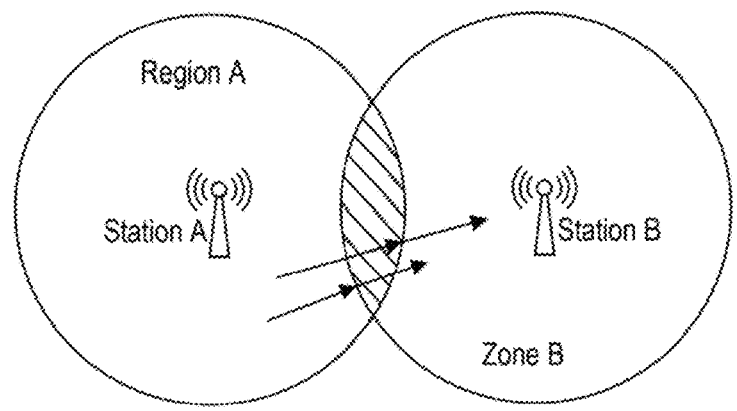
FIG. 2 schematically illustrates zones that are arranged adjacent to each other.

In some situations and for some services, neighboring zones may partly overlap. This is schematically illustrated in FIG. 2. For example, the first zone A and second Zone B may be essentially defined by the range of a first and second transmission station A, B. However, the ranges of neighboring transmission stations may partly overlap to guarantee a sustained coverage for the users. The user device may be a mobile phone, for example, which may be connected to the first transmission station A while it is in the first zone A. When the mobile phone is moved it may at one point still be within the transmission range of the first transmission station A, but may also already receive a signal from the second transmission station B. This overlap zone is shown hatched in FIG. 2. Different criteria may be used to define a static boundary between the first and second zones A, B. For example, the mobile phone may connect to the second transmission station B as soon as the signal from the second transmission station B is available or exceeds a predefined threshold. Another possibility is that the mobile phone connects to the second transmission station B when the signal from the first transmission station A is no longer available or falls below a predefined threshold. The two possibilities are illustrated with arrows in FIG. 2.

Generally, there are many situations in which different criteria may be used to define static boundaries between different zones. The criteria and, therefore, the static boundary is usually specified by the provider of a service. When a decision on the criteria has been taken, the boundary is then a fixed boundary and the same criteria are used for each zone and each user of this service. The criteria and, therefore, the course of the boundaries may be optimal in most situations and for most applications and users. However, they might not be optimal in other situations and for other applications and/or users. In some situations it might be desirable to change from a first service to a second service earlier, while in other situations it might be advantageous to change from a first service to a second service later or not at all.

There are systems which use so-called geo-fencing. A geo-fence generally is a virtual boundary for a real-world geographic area. A geo-fence can be generated by a user of a geo-fencing system. Usually a mobile device is connected to the system and the system monitors the location of this mobile device. Once the mobile device enters or exits the area defined by the geo-fence, a user may be notified. In this way, for example, parents may be notified if their child leaves a designated area, a user may be notified if his car leaves a designated area, or a ranger may be notified when wildlife stray into farmland. The boundary in a geo-fencing system usually is a pure geographic boundary that is defined by geographic coordinates.

The known concept of geo-fencing may also be used for telematics systems. Telematics generally is the combination of information and communication technology to send and receive data via telecommunications devices. It is used mainly in internet, telephone and mobile communications services as well as in vehicle telematics. Vehicle telematics can assist the driver of a vehicle in a wide range of situations and deliver useful information directly to the vehicle. In telematics, the position and the movement of a user device, for example, may be monitored. The position and movement of a user device or vehicle may be monitored using GSM (Global System for Mobile Communications), GPS (Global Positioning System), GLONASS (Russian Global Navigation Satellite System), Galileo (European Global Navigation Satellite System) or BeiDou (Chinese Satellite Navigation system), for example, as well as, e.g., using digital maps or behavioral patterns of the user device. Any other method may be used for monitoring the position and movement of the user device.

Figure 3:
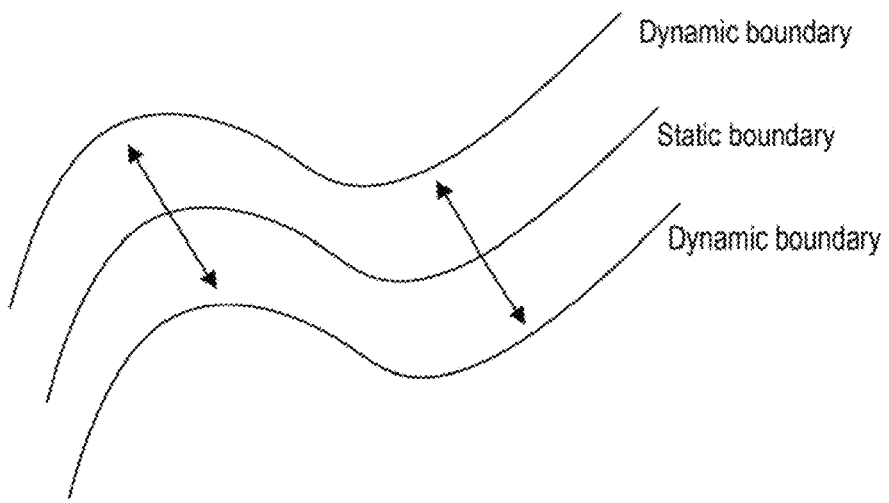
FIG. 3 schematically illustrates static and dynamic boundaries.

As is illustrated in FIG. 3, according to the present invention a boundary between two zones is not a static boundary. The boundaries between different zones are dynamic and may be shifted depending on the telematics application, user specific parameters, network parameters and or parameters that are specific for a user device. User specific parameters may include the native language of the user, the home address of the user, the business address of the user, or information about the route the user intents to take, for example. The network may be a network the user device is connected to, e.g. a telephone network, a mobile network, or an internet network. Network parameters may include the type of the network or a network distribution, for example. Parameters that are specific for a user device may include a set language, a set time, or a current speed of the user device, for example. Such information may influence the course of the boundary for the user device under the given circumstances.

The course of the dynamic boundary may be based on the course of a static boundary that is shifted by a variable distance. In some cases, the variable distance may be zero such that the dynamic boundary corresponds to the static boundary. In some cases, the boundary may be shifted such that the first zone "expands" and the second zone "contracts", in other cases the boundary may be shifted such that the first zone "contracts" and the second zone "expands", as is schematically illustrated in FIG. 3.

Once the dynamic boundary has been determined based on the geographic parameters and the non-geographic parameters, it may be determined whether the user device is located in the first zone A or in the second zone B. Depending on the zone the user device is located in, one or more telematics services may be activated or deactivated. For example, when the user device is detected in the second zone B, a telematics service may be activated which is available in the second zone B, but not in the first zone A. The availability of a service may be a general availability (e.g., the service is generally not available within one or more of the zones A, B) or an individual availability (e.g., the service is generally available in the first zone A and in the second zone B, however, the user has subscribed to the service in the first zone A only, but not in the second zone B). In some cases, it may not be necessary to activate or deactivate any services when the user device crosses a boundary. For example, the user device moves within the first zone A and a first service A and a second service B are activated. When the user device crosses the boundary, both services A, B may still be available and no additional services may be available for or needed by the user within the second zone B. Therefore, in this case neither the first service A nor the second service B needs to be deactivated and no further service needs to be activated.

Figure 4:
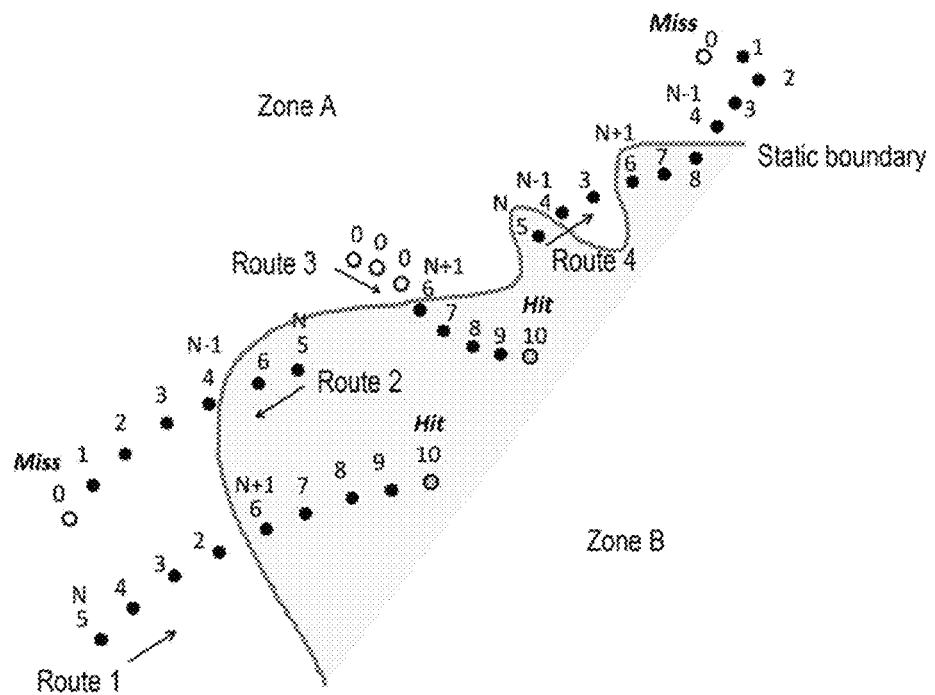
FIG. 4 schematically illustrates a static boundary separating a first zone from a second zone.
Figure 5:
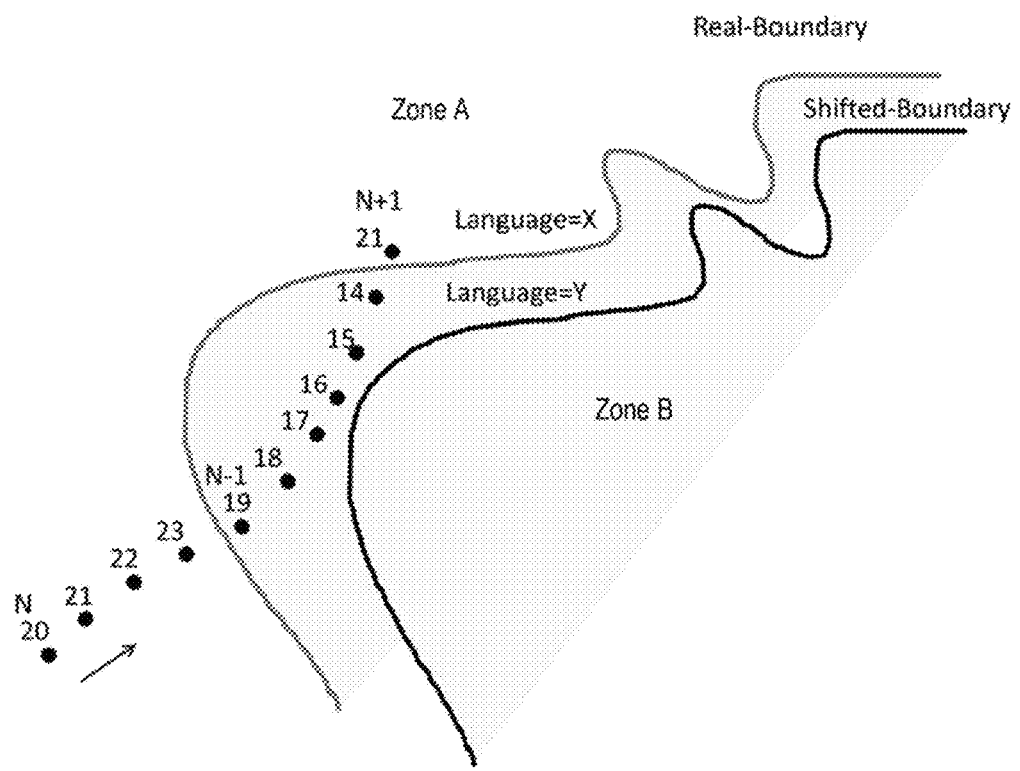
FIG. 5 schematically illustrates a static boundary and a dynamically shifted boundary separating a first zone from a second zone.

FIGS. 4 and 5 illustrate examples of how a boundary may be shifted. A static boundary may be a predefined boundary and may be defined based on predetermined criteria, e.g., the static boundary may correspond to a national border or may be defined by the range of one or more networks, the availability of telematics services or by geographical circumstances such as coordinates on a map, for example. A correction variable N may be defined, whereas N≥0. The initial value $N_{IN}$ of the correction variable N may be alterable. The initial value $N_{IN}$ of the correction variable N may be defined by the user or by the provider of a telematics service. The initial value $N_{IN}$ of the correction variable N may also be determined by the user device and may depend on the availability of a telematics service, on user specific parameters, on user device specific parameters or vehicle specific parameters, for example. In the example in FIG. 4, the initial value $N_{IN}$ of the correction variable N is 5 ($N_{IN}$=5). At startup of a user device, the correction variable N may be set to its initial value $N_{IN}$. The user device may periodically determine whether a certain condition is fulfilled or not. If the condition is fulfilled, the correction variable N may be increased, and if the condition is not fulfilled, the correction variable N may be decreased. For example, the user device may be turned on, the correction variable N may be set to its initial value $N_{IN}$ (e.g., N=$N_{IN}$=5) and it may then be determined in regular intervals whether the user device is in the second zone B (desirable zone). If the user device is located in the first zone A (and therefore not in the desired zone B), the condition is not fulfilled and the correction variable N is decreased by 1. This is repeated in regular intervals. Each time the condition is not fulfilled, the correction variable N is decreased by 1. This is exemplarily illustrated by means of route 1 in FIG. 4.

If the condition is not fulfilled, a first status may be generated. The first status may be a "miss"-status, for example. If, however, the condition is fulfilled, a second status may be generated. The second status may be a "hit"-status, for example. When it is detected that the user device crosses the static boundary and is now in the second zone B (desired zone), the condition is fulfilled for the first time and the second status (hit) directly succeeds the first status (miss). In this case (hit directly succeeding a miss), the correction variable N may be set to $N=N_{IN}+1$. In the example in FIG. 4, with $N_{IN}=5$, this means that when a "hit" directly follows a "miss", $N=6$. If it is then further detected that the user device is still in the second zone B (hit directly following a hit), N may be increased each time a "hit" is created (condition fulfilled). When a maximum value $N_{max}$ is reached, this may indicate that the user device is indeed in the second zone B and one or more telematics services may be activated or deactivated.

Summarizing the above, the following steps may be performed. When the second status (hit) directly follows the first status (miss), the correction variable N may be set to $N=N_{IN}+1$. When the second status (hit) directly follows the second status (hit), the correction variable N is increased by one and when the first status (miss) directly follows the first status (miss), the correction variable N is decreased by one. The procedure may be similar in the opposite direction. In the example of Route 2 in FIG. 4, the user device is detected in the second zone B (hit) after startup. The initial value $N_{IN}$ of the correction variable N, therefore, is increased so that $N=N_{IN}+1=6$. If then the first status (miss) follows the second status (hit) when the user device crosses the static boundary and is no longer detected in the second zone B, the correction variable N may be set to $N=N_{IN}-4$. The correction variable N may then be decreased each time the user device is not detected within the second zone B (miss directly following a miss), until $N=0$. When $N=0$, a final decision may be made that the condition is no longer fulfilled and the user device is now outside the desired zone.

The maximum value $N_{max}$ of the correction variable N may depend on the initial value $N_{IN}$ of the correction variable N, for example. For example, $N_{max}=N_{IN}$, with $x \geq 1$. This means that the higher the initial value $N_{IN}$ of the correction variable N, the longer it takes until a final decision may be made that the condition is actually fulfilled, and the lower the initial value $N_{IN}$ of the correction variable N, the faster a final decision may be made that the condition is actually fulfilled. In one example, $x=2$ and, therefore, $N_{max}=2*N_{IN}$. In this case the entering of a desired zone is detected as quickly or as slowly as the exiting of the zone. If $1<x<2$, the entering of a desired zone is detected faster than the exiling and if $x>2$, the exiting of a desired zone is detected faster than the entering.

Now referring to Route 3 of FIG. 4, the correction variable N may stay at its minimum value $N_{min}=0$ as long as the required condition is not fulfilled (miss). This means that the correction variable N may stay at its minimum value $N_{min}$ for a certain time, until the desired condition is fulfilled once more (hit). On the other hand, once the correction variable N has reached its maximum value $N_{max}$ it may stay at this value until it is detected that the condition is not fulfilled anymore (miss). When the static boundary is crossed in regular intervals, the correction variable may not reach either its minimum value $N_{min}$ or its maximum value $N_{max}$. Referring to Route 4 in FIG. 4, the value of the correction variable changes as long as the user device regularly crosses the static boundary. Only when it has been finally detected (maximum value $N_{max}$ reached) within one of the zones (first zone A in the current example), is a final decision made that it is within this zone.

The position of the user device may be detected based on any appropriate method. For example, the detection method may be based on the World Geodetic System (WGS). The World Geodetic System is a standard for use in cartography, geodesy, and navigation including GPS (Global Positioning System). It includes a standard coordinate system for the Earth, a standard spheroidal reference surface (the so-called datum or reference ellipsoid) for raw altitude data, and a gravitational equipotential surface (the so-called geoid) that defines the nominal sea level. The currently latest version WGS 84, established in 1984 and last revised in 2004. WGS 84 is the reference coordinate system used by the Global Positioning System. Another exemplary detection method is based on Ray casting for the estimation of the actual position of the user device within a zone on the map. Ray casting is the use of ray-surface intersection tests to solve a variety of problems in computer graphics and computational geometry. These are, however, only examples. Any other coordinate systems or position evaluation methods may also be used to determine the position of a user device in a predefined zone within a specified map. Such alternative maps may include network coverage distribution or languages map distribution, for example.

The predefined zones within a map may be dependent on the Service Layer Agreement (SLA) of the telematics provider, on user preferences or on dynamic conditions, for example, which may affect the initial value $N_{IN}$ of the correction variable N, as has already been described above.

A user device that is configured to execute the method for individually setting the boundaries by increasing or decreasing a correction variable N may hold a model that resembles a vector of multiple tuples (ID, int_counter, bool previous_real-state), wherein ID is the identification of a predefined zone (e.g., according to Service Layer Agreement), which may also be referred to as polygon, int_counter is a hit/miss reference counter, and bool previous_real_state indicates whether a directly preceding determination resulted in hit or miss, so that the counter may be reset when a boundary is crossed. An algorithm may comprise the following steps (1)-(4).

(1) If the identification of a polygon is ID=Y and the user device determines that its position is within the polygon, the counter is incremented by 1 (+1 added to counter). If the user device determines that its position is not within the polygon, the counter is decremented by 1 (−1 added to counter).

(2) At startup of the user device or when changes in the environment occur, the correction variable N is set to its initial value $N_{IN}$ (e.g., $N=N_{IN}=5$). The stop value of the correction variable N is $N_{max}=x*N_{IN}$ for "final hit" (e.g., detected within second zone B) and 0 for "final miss" (e.g., not detected within second zone B). For example, when $N=2*N_{IN}=10$ (if initial value $N_{IN}=5$), a "final hit" may be reported and the int counter is not further incremented (e.g., the second zone B is really entered). When $N=0$, a "final miss" may be reported and the int counter may not be further decreased (e.g., the second zone B is really exited). When it is detected that a zone is entered ("final hit" is reported) or exited ("final miss" is reported), one or more telematics services may be activated or deactivated.

(3) The bool previous_real_state may be used to reset the counter when the user device crosses the static boundary of the polygon. When the static boundary is crossed, the previous state may have been "hit" and the current state is "miss". If a "miss" directly follows a "hit", the correction variable N may be set to $N=N_{IN}-1$. In another example, when the static boundary is crossed, the previous state may have been a "miss" and the current state is "hit". If a "hit" directly follows a "miss", the correction variable N may be set to $N=N_{IN}+1$.

(4) The initial value $N_{IN}$ of the correction variable N may be dynamically adapted based on the Service Layer Agreements of the telematics provider, on user preferences and/or on dynamic conditions resulting from the movement of the user device which affects its general position on the map and its location within different zones. If any of the external conditions changes, the initial value $N_{IN}$ of the correction variable N may be updated based on the new conditions and the algorithm may be restarted with the new corrected initial value $N_{IN}$.

If the initial value $N_{IN}$ of the correction variable N is small, the described algorithm stabilizes the reporting for an expected entering exiting of a region if the position of the user device is quickly updated multiple limes and helps to cancel out flickering due to zone definitions or due to other borderline cases in the position and location-within-zone estimation algorithm.

FIG. 5 further illustrates how the static boundary may be shifted with the method described with respect to FIG. 4. The static boundary (real boundary) may separate a first zone A, in which a first language X is spoken, from a second zone B, in which a second language Y is spoken. At startup the initial value $N_{IN}$ of the correction variable N may be $N_{IN}=20$, for example. In this way it takes longer to reach a "final miss" (N=0) or a "final hit" ($N=2\times N_{IN}$) decision than for lower values such is $N_{IN}=5$, for example. Assuming that the first language X is the preferred language, the determination will produce a "hit" while the user device is detected in the first zone A. Therefore, the correction value increases as long as the user device is detected in the first zone A. When it is detected that the user device has crossed the static boundary (real boundary) and is now in the second zone B, the correction variable N is set to $N=N_{IN}-1$, because a "miss" directly follows a "hit". While the user device is detected in the second zone B a "miss" status is generated each lime it is detected that the condition (user device in first zone A) is not fulfilled. When the user device crosses the static boundary again back into the first zone A, a "hit" directly follows a "miss" and the correction variable is set to $N=N_{IN}+1$. In the given example, the initial value $N_{IN}$ of the correction variable N has been chosen rather high ($N_{IN}=20$). Therefore, even if the user device stays in the second zone B for a while, a final miss is not generated. Assuming the initial value $N_{IN}$ of the correction variable N had been set to $N_{IN}=5$ in the example of FIG. 5, a final miss would have been generated before the user device crosses the static boundary again back into the first zone A.

Instead of only using one correction variable it is also possible to use two correction variables. If only one correction variable N is used, this correction variable may be used for entering as well as for exiting of a desired zone. However, it is also possible to use a first correction variable N for entering (set correction variable to N, e.g., $N_{IN}=5$, once the user device crosses the static boundary out of desired zone) and a second correction variable M for exiting (set correction value to M, e.g. $M_{IN}=20$, once the user device crosses the static boundary into desired zone) of a desired zone. The initial values $N_{IN}$, $M_{IN}$ may be chosen individually for the first correction variable N and the second correction variable M. For example, the initial value $N_{IN}$ for the first correction variable N may be chosen to be smaller than the initial value $M_{IN}$ for the second correction variable M. In this way, the final entering (final hit) of a desired zone may be detected earlier than the exiting (final miss) of the desired zone. It is, however, also possible to choose the initial value $N_{IN}$ for the first correction variable N to be larger than the initial value $M_{IN}$ for the second correction variable M. In this way, the final entering of a desired zone may be detected later than the exiting of the desired zone.

The initial value $N_{IN}$, $M_{IN}$ of the first and/or second correction variable N, M may be chosen depending on dynamic conditions. For example, the initial value $N_{IN}$, $M_{IN}$ may depend on the speed at which the user device is moving. For example, if the user device is moving at a lower speed, the initial value may be decreased and if the user device is moving at a higher speed, the initial value may be increased, or vice versa.

The position of the user device may be determined in regular time intervals, for example. It is, for example, possible to determine every few seconds or every few minutes whether the user device is in the desired zone (hit) or not (miss). Any other criteria may be used to trigger the determination, e.g. a distance travelled.

Figure 6:
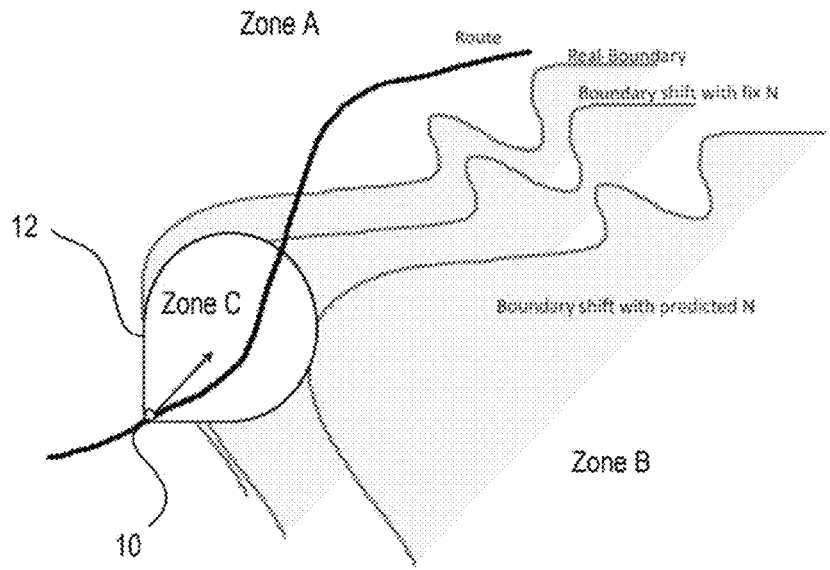
FIG. 6 schematically illustrates a static boundary and dynamically shifted boundaries separating a first zone from a second zone.

FIG. 6 schematically illustrates the basic principle of a method that is based on so-called multi-point calculations. For example, a geo-fence 12 may be created around the position of the user device 10. The geo-fence 12 may define a third zone C around the user device 10. The third zone C may have a certain shape and size. The position of the third zone C, however, may move together with the user device 10. For example, it may be defined that the user device 10 is always at a certain position with respect to the third zone C. In one example, the user device 10 is always in the center of the third zone C. In another example, as illustrated in FIG. 6, the user device 10 may always be at a certain point on the boundary of the third zone C.

When the user device 10 approaches the static boundary, the moving boundary of the geo-fence 12 and the static boundary may intersect at one point. The initial value $N_{IN}$, $M_{IN}$ of the correction variable N, M may be dependent on such intersections of the geo-fence boundary and the static boundary. For example, the dynamic boundary may take a first course when a fixed initial value is used for the correction variable and may take a different course when an alterable initial value $N_{IN}$, $M_{IN}$ is used. An example of different courses of the dynamic boundary is schematically illustrated in FIG. 6. The arrow in FIG. 6 indicates the direction of movement of the user device 10. If the correction variable N is alterable, the initial value $N_{IN}$ of the correction variable N may be predicted based on the intersection of the moving geo-fence boundary and the static boundary.

The basic rules for determining the dynamic boundary and/or the correction variables N, M may be set by the telematics provider Specific settings can be made either by the telematics provider or by the user. The information about specific settings may be shared between the telematics provider and the user. For example, the telematics provider may inform the user about specific settings he made. The user may then decide whether he keeps the predefined settings or may change the settings. On the other hand, the user may inform the telematics provider about the settings he made. By sharing information about the specific settings, a decision tree may be correctly built based on that information which may affect the application logic of the service running on the user device, and the provider infrastructure.

As has already been described above, the telematics provider may define certain zones in which the telematics services display a certain behavior. If criteria are defined for manipulating the static boundaries of the zones, the telematics services may perform more stable, in particular in such cases where the user does not really enter another zone, but just moves along the boundary between two neighboring zones of which one has a higher priority than the other.

Figure 7:
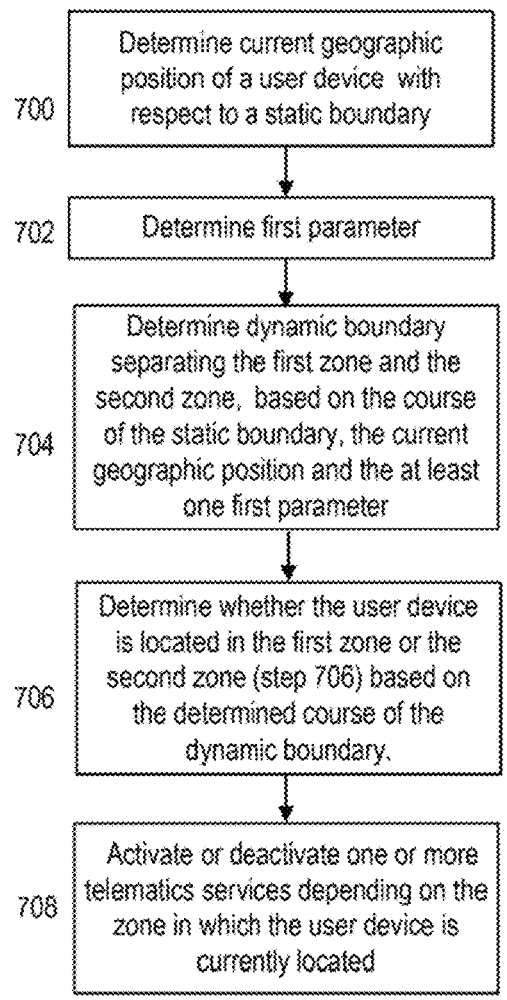
FIG. 7 illustrates in a flow chart a method for operating a telematics system.

Referring to FIG. 7, a method for operating a telematics system is illustrated by means of a flow chart. In a first step, the current geographic position of a user device may be determined with respect to a static boundary (step 700). The static boundary separates a first zone and a second zone and may be defined by geographic circumstances and coordinates, for example. A first parameter is then determined (set 702). The first parameter may comprise at least one of a user specific parameter, a user device specific parameter, and a network parameter of a network the user device is connected to. A dynamic boundary may then be determined (step 704) which separates the first zone and the second zone, wherein the dynamic boundary is determined based on the course of the static boundary, the current geographic position and the at least one first parameter. When the dynamic boundary has been determined, it may be further determined whether the user device is located in the first zone or the second zone (step 706) based on the determined course of the dynamic boundary. Depending on the zone in which the user device is currently located, one or more telematics services are activated or deactivated (step 708).

Figure 8:
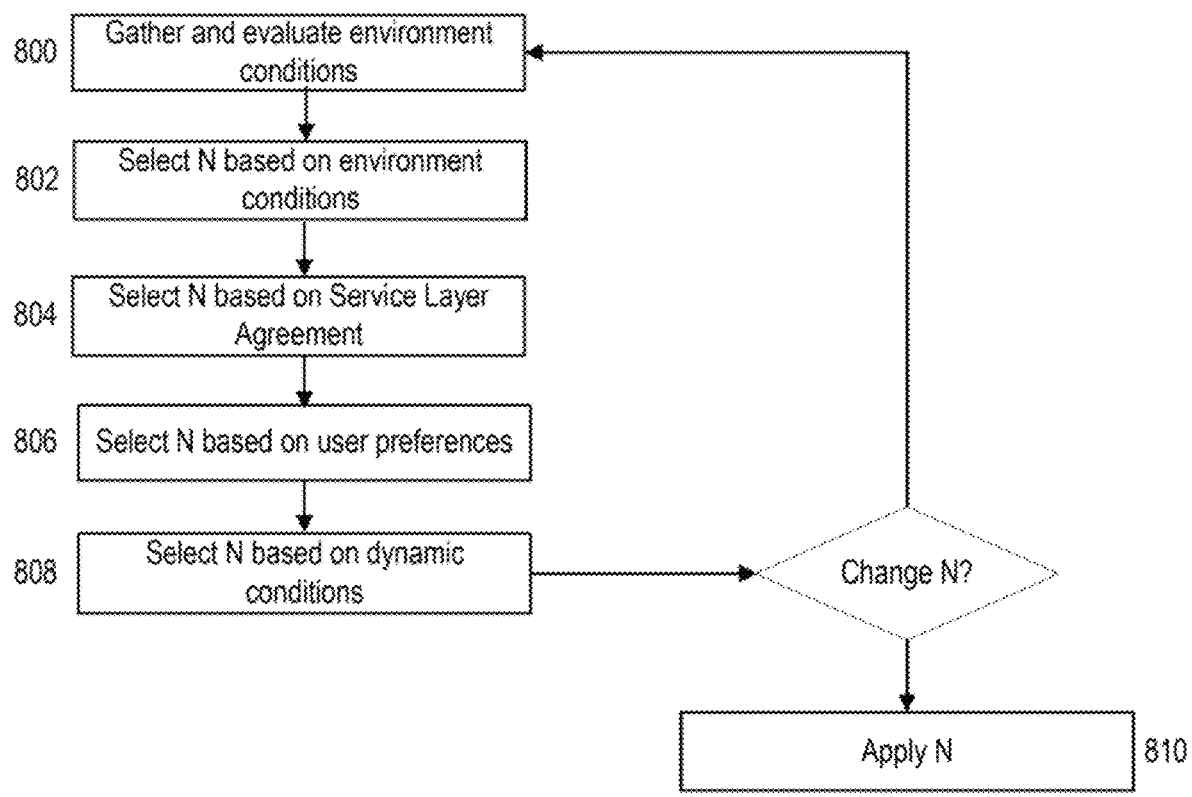
FIG. 8 illustrates in a flow chart a further method for operating a telematics system.

The flow chart in FIG. 8 illustrates another example of a method for operating a telematics system. In a first step, environment conditions may be collected and evaluated (step 800). Environment conditions may comprise a speed at which the user device is moving, a final destination of the user, a home or office address of the user anchor one or more preferred settings of the user, for example. An initial value $N_{IN}$ of a correction value N may be determined based on the environment conditions (step 802). The initial value $N_{IN}$ may further be adapted depending on a service layer agreement of the telematics provider (step 804), on user preferences (step 806) and on dynamic conditions (step 808). If any of the conditions change, a new initial value $N_{IN}$ may be used for the correction variable (step 810). Otherwise the method may return to step 800.

While various embodiments of the invention have been described, it will be apparent to those of ordinary skill in the an that many more embodiments and implementations are possible within the scope of the invention. Accordingly, the invention is not to be restricted except in light of the attached claims and their equivalents.

The invention claimed is:

1. A method for operating a telematics system, the method comprising the steps of:
   determining a current geographic position of a user device with respect to a static boundary separating a first zone and a second zone;
   determining at least one first parameter, the at least one first parameter comprising at least one of
      a user specific parameter,
      a user device specific parameter, and
      a network parameter of a network the user device is connected to;
   determining a dynamic boundary separating the first zone and the second zone, based on the course of the static boundary, the current geographic position and the at least one first parameter, determining the dynamic boundary comprises;
      setting a correction variable to an initial value;
      determining in regular intervals whether a first condition is fulfilled;
      generating a first status if the first condition is fulfilled; and
      generating a second status if the first condition is not fulfilled
   determining whether the current geographic position of the user device is located in the first zone or the second zone based on the course of the dynamic boundary; and
   activating or deactivating one or more telematics services depending on the zone the user device is located in.

2. The method of claim 1, wherein the static boundary is a predefined boundary, and wherein a course of the static boundary depends on at least one of
   a course of a national border;
   geographical circumstances;
   geographic coordinates;
   an availability of telematics services; and
   a range of one or more networks.

3. The method of claim 1, further comprising the steps of:
   increasing the initial value by one if a first status directly follows a first status;
   decreasing the initial value by one if a second status directly follows a second status;
   setting the correction variable to its initial value plus one if a first status directly follows a second status; and
   setting the correction variable to its initial value minus one if a second status directly follows a first status.

4. The method of claim 3, wherein a final decision is made that the condition is not fulfilled if the value of the correction variable reaches zero.

5. The method of claim 3, wherein a final decision is made that the condition is fulfilled if the value of the correction variable reaches a maximum value ($N_{max}$), wherein $N_{max} = x^* N_{IN}$ wherein, $N_{IN}$ is the initial value of the correction variable.

6. The method of claim 5, wherein x=2.

7. The method of claim 1, wherein the initial value may be dynamically adapted based on at least one of
   a service layer agreement of a telematics provider a telematics service;
   user preferences; and
   user device specific conditions.

8. The method of claim 1, wherein the initial value is predefined by the telematics provider of the telematics service or by the user.

9. The method of claim 1, wherein the user specific parameter comprises at least one of a native language of the user, a home address of the user, a business address of the user and information about a route the user is taking.

10. The method of claim 1, wherein the network comprises a telephone network, a mobile network or an internet network, and wherein the network parameter comprises the type of the network or a distribution of the network.

11. The method of claim 1, wherein the user device specific parameter comprises at least one of a set language, a set time, and a current speed of the user device.

12. The method claim 1, wherein
   a geo-fence is defined,
   the geo-fence defines a third zone, and
   the third zone is defined with respect to the position of the user device and moves according to the movement of the user device.

13. A telematics system comprising a user device that is configured to:

determine its current geographic position with respect to a static boundary separating a first zone and a second zone;

determine at least one first parameter, the at least one first parameter comprising at least one of
- a user specific parameter,
- a user device specific parameter, and
- a network parameter of a network the user device is connected to;

determine a dynamic boundary separating the first zone and the second zone, based on the course of the static boundary, the current geographic position and the at least one first parameter, determining the dynamic boundary further comprises;
- setting a correction variable to an initial value;
- determining in regular intervals whether a first condition is fulfilled;
- generating a first status if the first condition is fulfilled; and
- generating a second status if the first condition is not fulfilled;

determine whether the current position of the user device is located in the first zone or the second zone based on the course of the dynamic boundary; and activate or deactivate one or more telematics services depending on the zone the user device is located in.

* * * * *